Oct. 29, 1946. W. A. REANEY 2,410,235
METHOD AND APPARATUS FOR HEAT TREATING CALCAREOUS MATERIALS
Filed June 23, 1943
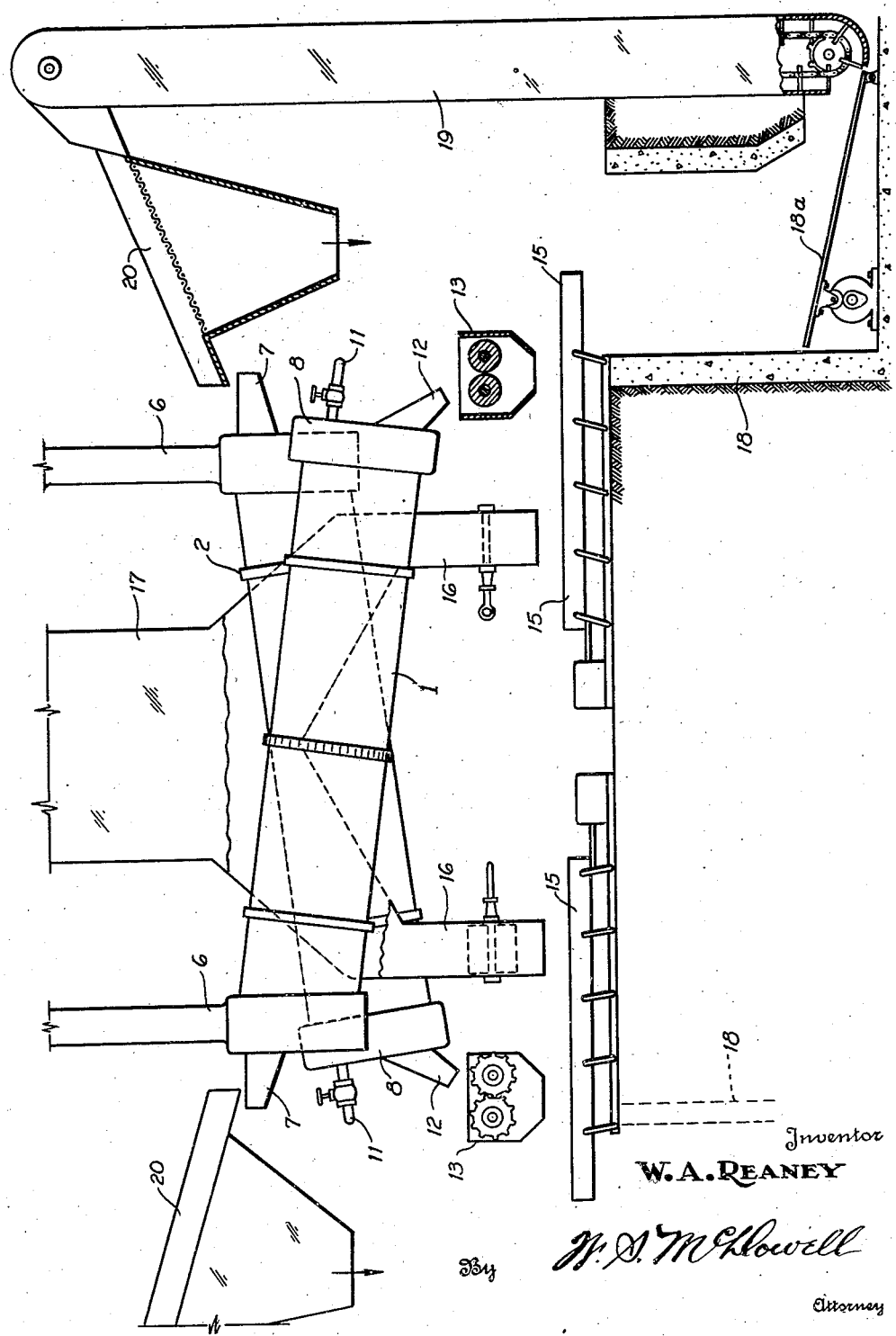
Inventor
W. A. REANEY
By W. A. McDowell
Attorney Patented Oct. 29, 1946

2,410,235

UNITED STATES PATENT OFFICE 2,410,235

METHOD AND APPARATUS FOR HEAT-TREATING CALCAREOUS MATERIALS

Warford A. Reaney, Delaware, Ohio

Application June 23, 1943, Serial No. 491,962

7 Claims. (Cl. 263—53)

This invention relates to an improved process and apparatus for effecting particularly the calcination of calcareous materials, such as limestone, marl or the like, a general object of the invention being to provide a process and apparatus by which such calcination may be carried out more economically and efficiently than has been done heretofore.

In the production of lime from limestone, it is a common practice to pass limestone in a partially crushed state through a heated kiln. While in the kiln, the limestone is fired to temperatures of the order of 1400° to 2000° F. Such burning of the limestone liberates its carbon dioxide content, leaving calcium oxide or lime as the calcined product. The heated lime upon its discharge from the kiln is allowed to cool, being thereafter crushed to a required degree of fineness suitable for various uses. In this usual procedure, the heat contained in the calcined lime is lost to the atmosphere and is not applied to any useful purpose.

Accordingly, the present invention consists in subjecting the hot lime, immediately upon its discharge from the calcining kiln, to a crushing operation, in which the lime is reduced in particle size while hot and, before the same is allowed to cool to any substantial extent, is brought into intimate and effective heat-exchanging contact with relatively cool charging limestone of larger particle size, whereby through such contact, the raw limestone fed to the process is preheated before it is introduced into the calcining kiln, so that the hitherto wasted heat of the burned lime is usefully employed in providing a continuously operating calcining system of high thermal efficiency, the differences in particle size of the lime and the limestone permitting of their ready separation.

Another object of the invention is to provide a process and apparatus in which such heat interchange between the incoming unheated charging material and the hot outgoing processed material is effected in a simple and direct manner, heat losses minimized and low operational costs provided.

In attaining this latter object, I preferably employ a pair of kilns of the rotary drum type, which are arranged in closely adjacent order with the material-discharging end of one kiln disposed contiguous to the material-receiving end of the other kiln. This arrangement enables the mixing of the heated lime and the charging limestone, the separation of the lime and limestone following heat transfer and the delivery of the preheated limestone to one of the kilns to be effected quickly, readily and with the use of structurally simple apparatus, all to the end of obtaining high economy in the equipmental, operational and maintenance costs of the system.

A further understanding of the invention may be obtained by reference to the accompanying drawing which illustrates, in schematic form, a typical system for carrying out the invention.

The apparatus disclosed in the accompanying drawing comprises a pair of kilns 1 and 2 which are preferably of the rotary drum type. The drum of each kiln is mounted, as usual, with its longitudinal axis slightly angular to the horizontal, each drum being supported and rotated by conventional means. The upper or material-receiving end of each of the kiln drums enters a vertical flue or gas outlet stack, shown at 6, the lower portion of each stack being provided with a limestone-receiving chute 7. Partially crushed limestone, for example, of such particle size that it will pass through a 2½ to 1¼ inch mesh screen is delivered to the chutes and is caused to pass through the kiln drums. The material-discharging end 8 of each kiln is provided with one or more fuel burners 11. By means of these burners, the interior of the drums are sufficiently heated so that the calcined products discharged by way of the chutes shown at 12 may possess temperatures of the order of from 1500° to 1800° F. These temperatures are subject to variations, depending upon the uses to which the calcined products are to be placed. In the operation of the kilns, the carbon dioxide content of the limestone is liberated and passed off with the kiln gases through the outlet stack 6, while the calcined product (CaO) is discharged at a high temperature through the outlet chutes 12.

The present invention aims to utilize the heat contained in the hot lime discharged from the kilns to effect heat economies in the fuel consumption of the system. In a preferred form of my invention, this may be accomplished by placing immediately beneath each of the chutes 12 a crushing mill 13, which may be of the driven roll type. By means of these crushing rolls, the hot lime may be reduced in its particle size so that the same will pass through a 1 inch mesh screen or smaller. These figures are given merely by way of illustration, since it is merely necessary in the operation of the system that the crushing of the hot lime should be so effected that the largest particle size of the lime is smaller than the smallest particle size of the limestone to be charged to the kilns.

After passing through the crushing rolls, the heated and crushed lime is deposited upon one of a pair of vibratory conveyor pans 15, in order that it may be brought into direct and intimate engagement with raw cool limestone delivered to said pans by valved conduits 16 leading from the bottom of the limestone bin 17.

The pans discharge this mixture of crushed and heated lime and limestone into soaking pits 18 and during the passage of the admixed materials through these pits, effective heat interchange takes place, so that the heat of the calcined lime is largely absorbed by the cooler limestone.

The bottom of each of the pits 18 communicates with a feeder 18a, which delivers the mixture to the lower end of an elevator 19. Each of these elevators conducts the mixture to an inclined screen shown at 20. As the material passes over these screens, the lime, because of its finer particle size, passes through the screen and is removed from the process as a commercial product, while the preheated limestone, because of its larger particle size, gravitates from the lower sides of said screens and is delivered to the material-receiving chutes of the kilns. Since the limestone has been very effectively preheated by its prolonged and intimate contact with the hot lime, considerably less fuel is required to be consumed in the kilns to bring the lime to calcination temperatures than when the limestone, as heretofore, is introduced in a cool or cold state into the kilns. In this manner, the general thermal efficiency of such a system of lime calcination is substantially improved.

While I prefer to employ the dual kiln arrangement disclosed in the drawing, since it simplifies the procedure of handling the lime and limestone mixtures, and increases the output of the system, nevertheless, it will be understood that a single kiln may be used, if desired, wherein the preheated limestone will be conducted from a screen of the type shown at 20 to the material-receiving end of the kiln.

While I have described my invention as being particularly applicable in the formation of lime from limestone, it is obvious that its features of operation are adaptable to other industrial applications wherein heat exchange is desired between hot processed materials and cool incoming charging materials such, for example, as in the manufacture of cement, or the processing of various metal-bearing ores.

I claim:

1. A process for burning limestone comprising calcining the same in any suitable manner, immediately subjecting the hot calcined lime to a mechanical operation in which its particle size is substantially reduced, while the reduced lime is in its heated condition bringing the same into intimate admixture with relatively cool limestone of larger particle size, screening the admixed material following heat interchange therebetween to separate the finer lime particles from the coarser preheated particles of limestone, and while the limestone is in such a preheated state subjecting the same to a calcining operation.

2. Apparatus for burning limestone comprising a pair of kilns into one of which limestone of relatively coarse particle size is introduced for passage therethrough, means for heating said lime to temperatures sufficiently high to dissociate carbon dioxide from the limestone to produce calcined lime, a crushing mechanism arranged to receive the calcined lime immediately upon its discharge from said kiln and operative to reduce the particle size of the lime, means for introducing relatively cool limestone of larger particle size into intimate admixture with the crushed lime, means for screening the crushed lime from the limestone following heat interchange between said materials, and means for transferring the preheated limestone to the entrance end of the other kiln.

3. A plant for burning limestone comprising a pair of rotary cylindrical kilns arranged in side by side order with their material-receiving and discharging ends reversed, crushing means for receiving heated materials discharged from said kilns to reduce the particle or lump size thereof, a receiver for unheated limestone of relatively coarse particle or lump size, conveying apparatus arranged for the reception and intermingling of the unheated coarse materials discharged from said receiver and the relatively highly heated fine materials discharged from said crushing means, and screening means cooperative with said conveying apparatus for separating the heated fine materials and delivering the segregated and preheated coarser size materials to the inlet ends of said kilns.

4. A plant for burning limestone comprising: a pair of rotary cylindrical kilns placed in juxtaposition with their material-receiving and discharging ends reversed, means for admixing the hot lime discharged from each of said kilns with limestone forming the charging material for said kilns, whereby to preheat the limestone prior to its introduction into said kilns, and means adjacent the receiving end of each kiln for separating the preheated limestone from the kiln-treated lime prior to the introduction of the limestone into said kilns.

5. A plant for burning limestone comprising a pair of cylindrical kilns placed in juxtaposition with the material-receiving end of one kiln adjacent the material-discharging end of the other, means for admixing the hot lime discharged from one kiln with raw limestone, whereby to preheat the limestone, and means for separating the thus preheated limestone from the kiln-treated lime, and for introducing such preheated limestone into the adjacent end of the other kiln.

6. A plant for burning limestone comprising a pair of cylindrical kilns placed in juxtaposition with the material-receiving end of one kiln adjacent the material-discharging end of the other, means for admixing the hot lime discharged from one kiln with raw limestone, a soaking pit in proximity to the adjacent ends of said kilns into which the mixture of hot lime and raw limestone is deposited, whereby the limestone is preheated while in said pit, means for removing the mixture from said pit, and means for immediately separating the thus preheated limestone from the kiln treated lime and for introducing such preheated limestone into the end of the other kiln.

7. The method of treating calcareous material which comprises calcining raw material of relatively coarse particle size, crushing the calcined material to relatively fine particle size, intimately mixing the hot, calcined, relatively fine material with fresh, relatively coarse raw material and maintaining the mixture until substantial heat exchange has occurred, whereby the raw material is preheated, and then separating by screening the fine, calcined material from the preheated coarse material.

WARFORD A. REANEY.